Aug. 31, 1954        W. C. BRUCKMAN ET AL        2,687,861
              WASHING MACHINE SUPPORT
                 Filed July 3, 1951

INVENTOR
William C. Bruckman
Morton A. Kreitchman
BY R P Morris
ATTORNEY

Patented Aug. 31, 1954

2,687,861

UNITED STATES PATENT OFFICE 2,687,861

WASHING MACHINE SUPPORT

William C. Bruckman, Newton, Iowa, and Morton A. Kreitchman, Irvington, N. J., assignors to International Telephone and Telegraph Corporation, a corporation of Maryland Application July 3, 1951, Serial No. 235,062

5 Claims. (Cl. 248—24)

This invention relates to vibration absorbing and supporting members and particularly to such members as used in connection with washing machines.

In the washing machine industry there has always existed the problem of efficiently and effectively absorbing the vibrations caused by the rotating basket before the vibrations could reach the outer casing of the machine. Resilient spring suspension of the tub within its casing may serve to prevent most of the vibrations from reaching the casing. However, in the direction where the major weight support is required some more rigid shock absorbing device must be used. Heretofore, a rubber spherical ball arrangement was commonly employed to dampen out the vibrations of a rotary basket mounted within a tub wherein a rubber sphere was contained in a retainer fastened to the casing and located between the tube and the outer casing to furnish the principal weight support. An example of an arrangement of this type is illustrated in our copending application Serial No. 12,983, filed March 4, 1948. The shortcomings of this arrangement are that since the sphere is made from a homogeneous material a compromise was necessitated in selecting the material best suited for the dual functions of absorbing the vibrations and supporting the tub. Hence, the rubber sphere although dampening the predominant vibrational forces wears rapidly because of the scuffing that exists between the surfaces of the sphere, the tub and support respectively, therefore requiring frequent replacements. In addition a sphere of sufficient diameter to provide adequate supporting areas is relatively resistant to lateral movement so it may not have sufficient resilience in these directions to provide the desired degree of dampening. Further, the rubber sphere was not economical because all the rubber contained therein was not effectively used.

The object of this invention is to correct the above mentioned shortcomings by providing a heterogeneous supporting and absorbing member having a shape making maximum use of the materials employed.

According to the invention applicants provide a resilient cylindrically shaped body particularly suitable for absorbing vibrations, having an upper portion in the shape of a shoulder and a neck, and a spherical base portion. A spherical cap made of a material having high abrasive resistance is bonded to the neck portion for engagement with the vibrating tub. The cylindrical body is supported by a cup member surrounding the cylindrical body in a spaced relation thereto, thus permitting a free rolling action of the cylindrical body in the space between its shoulders and the inner periphery of the cup member. The obvious advantage of this design is that the cylindrical body is made of a desired diameter and of a material offering maximum resistance to the transmission of vibrational forces and the cap made of a material offering maximum abrasive resistance to scuffing with the tub, thereby combining the advantages of both materials in a single rugged member. In addition, the economy of the member is realized in that all the material contained therein is effectively and efficiently utilized by virtue of its shape.

The above mentioned and other features and objects of this invention and the manner of attaining them will become more apparent and the invention itself will be best understood, by reference to the following description of an embodiment of the invention taken in conjunction with the accompanying drawings, wherein.

Figure 1:
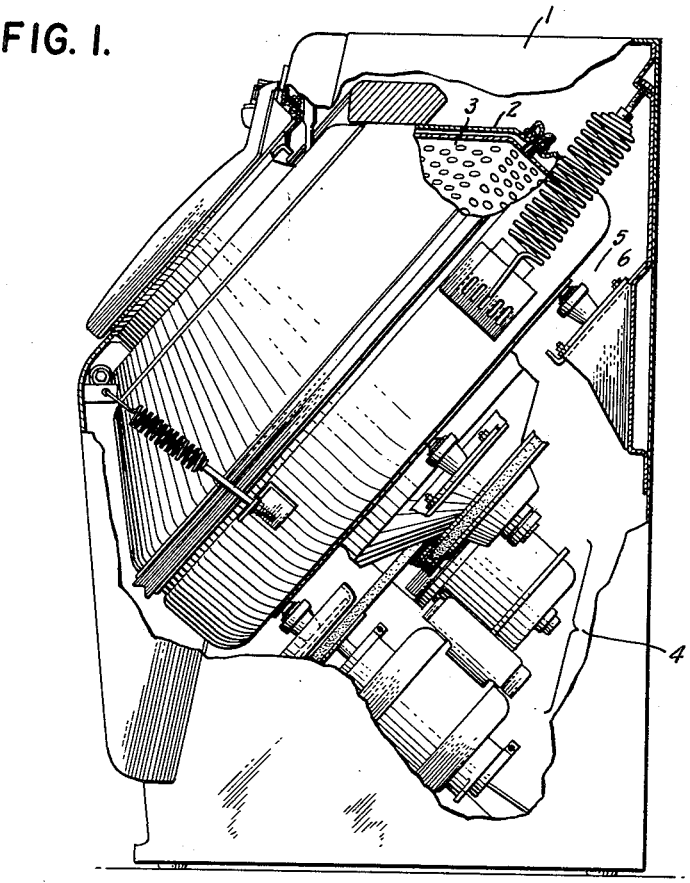
Fig. 1 is a side view showing the supporting members in their proper position in the washing machine.

Referring to Fig. 1, the particular machine chosen for demonstrating the principles of our invention comprises an outer casing 1, a water-containing tub 2, approximately frusto-conical in shape, and a perforated basket 3 of similar shape and closely spaced with respect to the tub. A centrally located motor drive and transmission system generally indicated at 4 is used to drive the basket through the various speeds during the washing operation. The tub 2 has its principal weight resting on supporting and vibration absorbing members 5 connected between it and the framework 6 of the machine.

During particular time periods of operation the speed of the rotating basket passes through a certain "critical" speed so that the amplitude of oscillation of the basket-tub assembly is momentarily and markedly increased imparting gyratory vibrations to the tub 2 which transmits the vibrations to the supporting and absorbing members 5. The supporting members are designed and shaped to effectively and efficiently absorb all the forces that can be axially resolved. However, the transverse components of the vibrational forces induce the supporting members into a lateral movement and in order to limit the excursions of the tub during this period of vibration, we limit the travel of the free-rolling support members; the limit being placed just beyond the normal, high speed, steady state amplitude of the tub oscillations. The members 5 are made to roll in contact with a flat-bottomed cup 6, the diameter of the cup, relative to the diameter of the supporting member, being fixed by substantially the maximum desired travel of the tub. When the members stop against the sides of the cups, the tub can travel no further except by sliding on the spherical surface of the supporting member. The spherical surface is made from material having a suitable coefficient of friction for effectively snubbing the tub travel.

Figure 2:
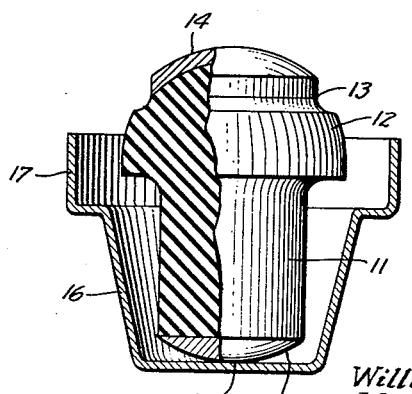
Fig. 2 shows a cut-away view of the supporting member seated in the cup member.

Referring now to Fig. 2 each of the supporting members 5 comprises a cylindrical body 11 having a shoulder portion 12 and a neck portion 13 tapering outwardly towards said shoulder portion. Connected to the neck portion 13 is a segmental spherical cap 14 made of a material having high abrasive resistance and relatively low coefficient of friction. A second segmental spherical cap 15, which is preferably made of metal is connected to the base of cylindrical body 11. It has been found from experiment that optimum operating results are achieved when the spherical curvature of caps 14 and 15 have a common center.

A cup member 16 having a shoulder section 17 and a flat bottom 18 is provided to support cylindrical member 11, in spaced relation thereto so that the cylindrical member may have the desired free rolling action when required.

Materials which have been found suitable for supports made according to this invention are: a rubber or rubber substitute for the cylindrical body having a Shore durometer rating of approximately 50 and an initial elastic deflection of approximately 3/8" when compressed axially by a force of 35 pounds; an asbestos material or an asbestos substitute for the upper cap 14 having phenolic resin binder and a tensile strength of not less than 200 p. s. i., a suitable material for the cap is commonly known under the trademark Raybestos; and a material having low coefficient of friction, such as steel, for the lower cap 15.

While we have described above the principles of our invention in connection with specific apparatus, it is to be clearly understood that this description is made only by way of example and not as a limitation to the scope of our invention.

What is claimed is:

1. A vibration absorbing member for movable connection between a vibrating member and a non-vibrating member comprising a resilient member having an upper portion in the shape of a shoulder and a neck, and a spherical base portion, a segmental spherical cap made of material having high abrasive resistance fixedly attached to the neck portion of said resilient member, the cap engaging said vibrating member, and means providing a flat supporting surface for said resilient member connected to the non-vibrating member and surrounding said resilient member in spaced relation thereto at all lateral points thereof, thus permitting the resilient member to have free rolling action in the space between the shoulders of the resilient member and the inner periphery of the supporting means.

2. In a machine having a member causing vibrational disturbances, a support for said member for absorbing the vibrations comprising a resilient member, a first segmental spherical cap having high abrasive resistance connected to said resilient member and engaging said vibrating member, a flat-bottomed cup member supporting said resilient member and connected to said machine, a non-resilient segmental spherical cap connected to the bottom of said resilient member and making rolling contact with the bottom of said cup member, the cup member including an abutment surrounding said resilient member in spaced relation thereto at all lateral points thereof, thereby permitting a free rolling movement of the resilient member in said space.

3. A machine support for absorbing the vibration of a rotating basket in a washing machine having a tub with the basket mounted for rotation in said tub comprising a resilient cylindrical member having a shoulder and neck portion and a spherically shaped base portion, a segmental spherical cap for engaging said tub made of a different material than said cylindrical member and having abrasive resistance being connected to said neck portion, and a flat-bottomed cup member supporting said cylindrical member, the base portion of said cylindrical member making rolling contact with the bottom of said cup member, the cup member including an abutment surrounding said cylindrical member in spaced relation thereto at all lateral points thereof, thus permitting a free rolling action of said cylindrical member in the space between its shoulder and the inner periphery of said abutment.

4. The machine support according to claim 3 wherein the cylindrical member is made from a rubber-like material.

5. The support machine according to claim 3 wherein the cap is made from an asbestos material having a phenolic resin binder.

References Cited in the file of this patent

UNITED STATES PATENTS

| Number | Name | Date |
| --- | --- | --- |
| 1,445,617 | Jehu | Feb. 13, 1923 |
| 2,296,260 | Breckenridge | Sept. 22, 1942 |
| 2,356,818 | Bruckman | Aug. 29, 1944 |
| 2,359,036 | Harper | Sept. 26, 1944 |
| 2,571,281 | Neher | Oct. 16, 1951 |
| 2,572,718 | Gifford | Oct. 23, 1951 |
| 2,572,969 | Bacon et al. | Oct. 30, 1951 |